(12) United States Patent
Jeong et al.

(10) Patent No.: US 9,917,302 B2
(45) Date of Patent: Mar. 13, 2018

(54) ELECTRODE ACTIVE MATERIAL FOR LITHIUM SECONDARY BATTERY, METHOD OF PREPARING THE ELECTRODE ACTIVE MATERIAL, ELECTRODE FOR LITHIUM SECONDARY BATTERY INCLUDING THE SAME, AND LITHIUM SECONDARY BATTERY USING THE SAME

(75) Inventors: Chang-Ui Jeong, Yongin-si (KR); Sung-Hwan Moon, Yongin-si (KR); Jae-Hyuk Kim, Yongin-si (KR); Yury Matulevich, Yongin-si (RU); Hee-Young Chu, Yongin-si (KR); Myung-Hwan Jeong, Yongin-si (KR); Jong-Seo Choi, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1239 days.

(21) Appl. No.: 13/585,371

(22) Filed: Aug. 14, 2012

(65) Prior Publication Data
US 2013/0089786 A1    Apr. 11, 2013

(30) Foreign Application Priority Data

Oct. 11, 2011   (KR) .................. 10-2011-0103599

(51) Int. Cl.
*H01M 4/48* (2010.01)
*H01M 4/04* (2006.01)
(Continued)

(52) U.S. Cl.
CPC ............ *H01M 4/366* (2013.01); *H01M 4/48* (2013.01); *H01M 4/505* (2013.01); *H01M 4/525* (2013.01); *H01M 10/052* (2013.01)

(58) Field of Classification Search
CPC .................................................. H01M 4/366
See application file for complete search history.

(56) References Cited

U.S. PATENT DOCUMENTS 6,653,021 B2   11/2003   Kweon et al.
7,709,151 B2    5/2010   Inoue et al.
(Continued)

FOREIGN PATENT DOCUMENTS

JP   2009-263176 A   11/2009
KR   2001-0085726 A   9/2001
(Continued)

OTHER PUBLICATIONS

Korean Office Action issued by Korean Industrial Property Office dated Mar. 4, 2016 in connection with Korean Patent Application No. 10-2011-103599 and Request for Entry attached herewith.
(Continued)

*Primary Examiner* — Barbara Gilliam
*Assistant Examiner* — Stephan Essex
(74) *Attorney, Agent, or Firm* — Robert E. Bushnell, Esq.

(57) ABSTRACT

An electrode active material for a lithium secondary battery, a method of preparing the electrode active material, an electrode for a lithium secondary battery which includes the same, a lithium secondary battery using the electrode. The electrode active material includes a core active material and a coating layer including magnesium aluminum oxide ($MgAlO_2$) and formed on the core active material. 1s binding energy peaks of oxygen (O) in the electrode active material measured by x-ray photoelectron spectroscopy (XPS) are shown at positions corresponding to 529.4±0.5 eV, about 530.7 eV, and 531.9±0.5 eV, and a peak intensity at the position corresponding to 529.4±0.5 eV is stronger than a peak intensity at the position corresponding to about 530.7 eV.

14 Claims, 11 Drawing Sheets

(51) Int. Cl.
  *H01M 4/485* (2010.01)
  *H01M 4/36* (2006.01)
  *H01M 4/505* (2010.01)
  *H01M 4/525* (2010.01)
  *H01M 10/052* (2010.01)

(56) References Cited

U.S. PATENT DOCUMENTS

| | | | |
|---|---|---|---|
| 2001/0031397 A1* | 10/2001 | Kweon | H01M 4/131 429/218.1 |
| 2002/0076613 A1 | 6/2002 | Lee et al. | |
| 2003/0099884 A1* | 5/2003 | Chiang | G02F 1/1523 429/233 |
| 2004/0191628 A1 | 9/2004 | Inoue et al. | |
| 2005/0014065 A1 | 1/2005 | Jung et al. | |
| 2010/0028776 A1 | 2/2010 | Park et al. | |
| 2011/0042609 A1 | 2/2011 | Park et al. | |
| 2011/0086271 A1 | 4/2011 | Lee et al. | |
| 2013/0202959 A1 | 8/2013 | Chiang et al. | |

FOREIGN PATENT DOCUMENTS

| | | |
|---|---|---|
| KR | 2002-0046658 A | 6/2002 |
| KR | 1020030033912 A | 5/2003 |
| KR | 2004-0084761 A | 10/2004 |
| KR | 2008-0068593 A | 7/2008 |
| KR | 1020090092348 A | 8/2009 |
| KR | 1020110019574 A | 2/2011 |

OTHER PUBLICATIONS

KIPO Registration Determination Certificate dated Sep. 28, 2016, and the cited references, issued by the Korean Intellectual Property Office for a Korean application No. 10-2011-0103599, which corresponds to the subject U.S. Application and Request for Entry of the Accompanying Registration Determination Certificate attached herewith.

* cited by examiner

ELECTRODE ACTIVE MATERIAL FOR LITHIUM SECONDARY BATTERY, METHOD OF PREPARING THE ELECTRODE ACTIVE MATERIAL, ELECTRODE FOR LITHIUM SECONDARY BATTERY INCLUDING THE SAME, AND LITHIUM SECONDARY BATTERY USING THE SAME

CLAIM OF PRIORITY

This application makes reference to, incorporates the same herein, and claims all benefits accruing under 35 U.S.C. § 119 from an application earlier filed in the Korean Intellectual Property Office on the 11 Oct. 2011 and there duly assigned Serial No. 10-2011-0103599.

BACKGROUND OF THE INVENTION

Field of the Invention

One or more embodiments of the present invention relate to an electrode active material for a lithium secondary battery, a method of preparing the electrode active material, an electrode for a lithium secondary battery, which includes the same, and a lithium secondary battery using the electrode.

Description of the Related Art

Lithium secondary batteries that are highlighted as a power source for the latest small portable electronic devices exhibit high energy density because the lithium secondary batteries, which use organic electrolytes, have discharge voltages that are twice or more higher than those of typical batteries using alkaline aqueous solutions.

A lithium secondary battery uses materials capable of intercalating and deintercalating lithium ions, as in a negative electrode and a positive electrode, and is prepared by disposing an electrolyte between the positive electrode and the negative electrode. The lithium secondary battery generates electrical energy by oxidation reaction and reduction reaction when lithium ions are inserted and extracted at the positive electrode and the negative electrode, respectively.

SUMMARY OF THE INVENTION

One or more embodiments of the present invention include an improved electrode active material for a lithium secondary battery.

One or more embodiments of the present invention include an electrode active material for a lithium secondary battery having improved life span characteristics and thermal stability, a method of preparing the electrode active material, an electrode for a lithium secondary battery which includes the same, and a lithium secondary battery using the electrode.

Additional aspects will be set forth in part in the description which follows and, in part, will be apparent from the description, or may be learned by practice of the presented embodiments.

According to one or more embodiments of the present invention, an electrode active material for a lithium secondary battery includes a core material and a coating layer including magnesium aluminum oxide ($MgAlO_2$) and formed on the core active material. 1s binding energy peaks of oxygen (O) in the electrode active material measured by x-ray photoelectron spectroscopy (XPS) shown at positions corresponding to 529.4±0.5 eV, about 530.7 eV, and 531.9±0.5 eV. A peak intensity at the position corresponding to 529.4±0.5 eV is stronger than a peak intensity at the position corresponding to about 530.7 eV.

According to one or more embodiments of the present invention, a method of preparing an electrode active material includes obtaining a core active material, which has an aluminum oxide ($Al_2O_3$) coating layer, by coating $Al_2O_3$ on the surface of the core active material, and performing a heat treatment on the core active material which has the aluminum oxide ($Al_2O_3$) coating layer.

The heat treatment is performed at a temperature range of about 300° C. to about 1000° C.

The coating of $Al_2O_3$ on the surface of the core active material includes coating the core active material with a mixture of aluminum salt and a solvent, and drying the core active material.

According to one or more embodiments of the present invention, an electrode for lithium secondary battery includes the foregoing electrode active material.

According to one or more embodiments of the present invention, a lithium secondary battery includes the foregoing electrode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
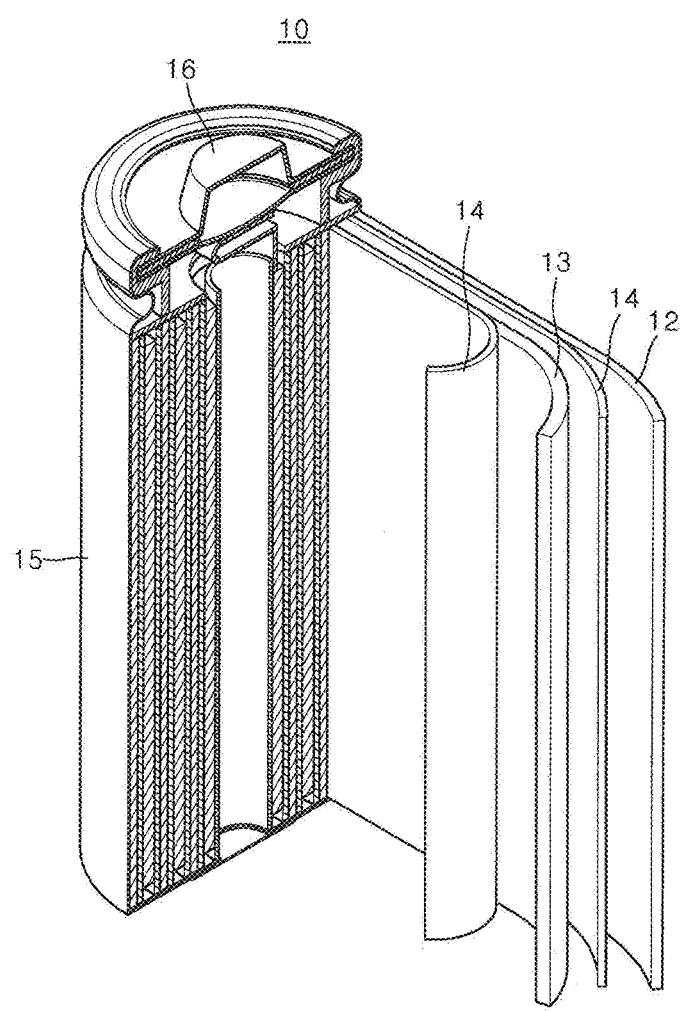
FIG. 1 is a schematic image showing a typical structure of a lithium secondary battery constructed as an embodiment according to the principles of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

The life span of a contemporary lithium secondary battery is decreased because an irreversible product is formed by a reaction between an electrolytic solution and an active material and the electrolytic solution decomposes during charging and discharging of the battery. In order to prevent such a decrease in the battery's life span, a method of coating $Al_2O_3$, $AlPO_4$, lithium titanium aluminum phosphate, or the like on the surface of a positive electrode active material or a negative electrode active material has been suggested.

There is much room for improvement, however, because lithium batteries have not reached a satisfactory level with respect to life span characteristics.

An electrode active material for a lithium secondary battery constructed as an embodiment according to the principles of the present invention includes a core active material, and a coating layer including magnesium aluminum oxide ($MgAlO_2$) and formed on the core active material. 1s binding energy peaks of oxygen (O) in the electrode active material measured by x-ray photoelectron spectroscopy (XPS) are shown at positions corresponding to 529.4±0.5 eV, about 530.7 eV, and 531.9±0.5 eV, and, a peak intensity at the position corresponding to 529.4±0.5 eV is stronger than a peak intensity at the position corresponding to about 530.7 eV.

An intensity ratio of the peak at the position corresponding to 529.4±0.5 eV to the peak at the position corresponding to about 530.7 eV is, for example, between about 1:0.6 through about 1:0.9.

The peak intensity at the position corresponding to 531.9±0.5 eV is either the same or stronger than the peak intensity at the position corresponding to about 530.7 eV.

The intensity ratio of the peak at the position corresponding to about 530.7 eV to the peak at the position corresponding to 531.9±0.5 eV is, for example, between about 1:1.0 through about 1:1.3.

The peak intensity at the position corresponding to about 529.4±0.5 eV is either the same or stronger than the peak intensity at the position corresponding to about 531.9±0.5 eV.

The intensity ratio of the peak at the position corresponding to about 529.4±0.5 eV to the peak at the position corresponding to about 531.9±0.5 eV is, for example, between about 1:0.7 through about 1:1.0.

When the intensity ratios of the peaks are in the foregoing ranges, an electrode active material for a lithium secondary battery with a long life span and high thermal stability may be obtained.

Examples of the core active material may be a compound represented by the following Formula 1 but is not particularly limited thereto.

$$Li_aMg_bMO_2$$ 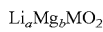   [Formula 1]

In the Formula 1, M is at least one selected from the group consisting of cobalt (Co), manganese (Mn), iron (Fe), and nickel (Ni), 0<a≤1, and 0<b<0.5.

An example of a compound in the Formula 1 may be $LiCoO_2$ doped with magnesium (Mg).

A 1s binding energy peak of oxygen at the position corresponding to 529.4±0.5 eV (hereinafter, peak A) shows an oxygen peak of metal oxide core active material. For example, when the core active material is Mg-doped $LiCoO_2$, the peak A shows the peak of oxygen bound in the form of $LiCoO_2$.

The 1s binding energy peak of oxygen at the position corresponding to 531.9±0.5 eV (hereinafter, peak C) shows an oxygen peak of metal oxide coated on the surface of the core active material.

The core active material, for example, is Mg-doped $LiCoO_2$, and the metal oxide, for example, is aluminium oxide ($Al_2O_3$).

The 1s binding energy peak of oxygen at the position corresponding to about 530.7 eV (hereinafter, peak B) shows a peak position of oxygen binding other than the oxygen bindings in the materials related to peak A and peak C (for example, metal oxide such as $LiCoO_2$ and $Al_2O_3$) mentioned above in the electrode oxide.

In an electrode active material according to an embodiment of the present invention, an intensity of peak A is about 13969 arbitrary unit (hereinafter referred to as "a.u."), an intensity of peak B is about 10386 a.u., and an intensity of peak C is about 12360 a.u.

An intensity ratio of peaks A and B is about 1:0.74, an intensity ratio of peaks A and C is about 1:0.88, and an intensity ratio of peaks B and C is about 1:1.19.

The binding energy peak of Mg measured by XPS is shown at a position corresponding to an Mg auger line which is 304.2±0.5 eV and at a position corresponding to a 1s peak of Mg which is 1302.2±0.5 eV.

The intensity ratio of peak A and peak C is about 1:0.7 to about 1.09, for example, 1:0.88. When the ratio of peak A and peak C is within this range, the coating layer composed of $MgAlO_2$ may be observed. If such an electrode active material is used, a lithium secondary battery with high thermal stability and a long life span may be manufactured.

In an electrode active material constructed as an embodiment according to the principles of the present invention, 60 weight % or more of $MgAlO_2$ measured by energy dispersive x-ray analysis (EDX) may exist on the surface area of the coating layer.

The 60 weight % or more of $MgAlO_2$ is present on the surface area of the coating layer with penetration depth of 2 μm or less, based on the total weight of the coating layer with the penetration depth of 2 μm or less measured by EDX. Therefore, if 60 weight % or more of $MgAlO_2$ is on the surface area of the coating layer, the function of protecting the core active material from an electrolytic solution is enhanced, and thus capacity and thermal stability of the electrode active material are both improved.

The 60 weight % or more of $MgAlO_2$ may be, for example, about 65 to about 90 weight %, more specifically, about 80 to about 85 weight %.

The penetration depth measured by EDX is about 1 to 2 μm.

When the penetration depth of the coating layer measured by EDX is 2 μm or less, for example 1-2 μm, the content of Mg is about 0.01 to about 3.0 weight % based on the total weight of the coating layer. Also, when the penetration depth of the coating layer measured by EDX is 2 μm or less, the content of Al is about 0.01 to about 3.0 weight % of the total weight of the coating layer. Therefore, each Mg and Al in the coating layer of an electrode active material exists with penetration depth of 2 μm or less measured by EDX due to Mg in a core active material moving to the surface area of the coating layer during a heat treatment process.

The content of Mg of an electrode active material in penetration depth of 2 μm or less of the coating layer measured by EDX is about 0.02 to about 20 parts by weight, for example, about 0.0286 to about 20 parts by weight based on 100 parts by weight of oxygen in the coating layer with the penetration depth of 2 μm or less. Also, the content of Al is about 0.02 to about 20 parts by weight, for example, about 0.0286 to about 20 parts by weight based on 100 parts by weight of oxygen in the coating layer with penetration depth of 2 μm or less.

An electrode active material constructed as an embodiment according to the principles of the present invention has a carbon (C) content of about 20 to about 40 weight %, an oxygen content of about 15 to about 35 weight %, and a cobalt content of about 30 to about 50 weight % based on the total weight of the coating layer with a penetration depth of 2 μm or measured by EDX.

The carbon is from carbon tape used for sample loading in EDX analysis.

The EDX analysis was performed using EDAX from AP Tech Corporation installed in a SEM of SIRION200 from FEI Company.

The intensity of a beam was about 5 kV, and the magnification was about 500 times. In an electrode active material constructed as an embodiment according to the principles of the present invention, the surface area of the coating layer may be understood as the outer area of the coating layer with a penetration depth of 2 μm or less. This penetration depth is used for surface analysis.

An average particle diameter of the electrode active material is, for example, in the range of about 1 μm to about 80 μm. When the average particle diameter of an electrode active material is in this range, capacity characteristics of a battery are excellent.

When a coating layer composed of the compound of Formula 1 is formed on the surface of a core active material, the electrode active material has stable characteristics and maintains low resistance characteristics in an environment of continuous insertion and extraction of lithium ions.

In an electrode active material according to an embodiment of the present invention, a thickness of a coating layer is in the range of about 1 nm to about 100 nm. When the thickness of the coating layer is in this range, ion conduction properties of the electrode active material are excellent.

Figure 13:
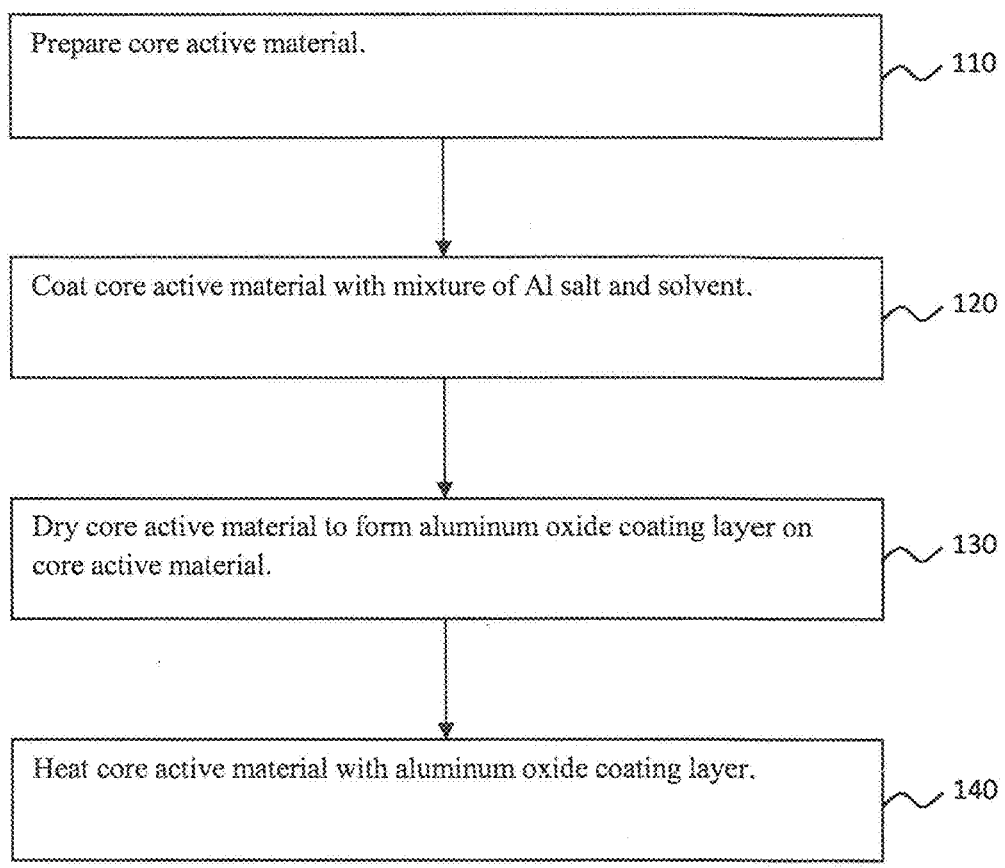
FIG. 13 is a flow chart illustrating a method of preparing an electrode active material for a lithium secondary battery as an embodiment according to the principles of the present invention.

Hereinafter, a method of preparing an electrode active material for a lithium secondary battery, as an embodiment according to the principles of the present invention, will be described. FIG. 13 is a flow chart illustrating the method of preparing the electrode active material for the lithium secondary battery as an embodiment according to the principles of the present invention.

First, a core active material is prepared (step 110 in FIG. 13).

In the core active material, a content of Mg in Mg-doped $LiCoO_2$ according to an embodiment of the present invention is about 1 to about 15 parts per million (ppm), for example, 10 ppm.

Next, an $Al_2O_3$ coating layer is formed on the surface of the core active material.

The $Al_2O_3$ coating layer is prepared by going through processes of coating the core active material with a mixture of Al salt and a solvent (step 120) and drying the resultant (step 130).

Aluminum alkoxide may be used for the Al salt. Examples of aluminum alkoxide may be aluminum methoxide, aluminum ethoxide, aluminum isopropoxide, and the like.

Examples of the solvent may be alcohol, hexane, chloroform, tetrahydrofurane, ether, methylene chloride, acetone, and the like. The alcohol may be methanol, ethanol, butanol, isopropanol, and the like.

A content of the solvent is in the range of about 100 parts by weight to about 3000 parts by weight based on 100 parts by weight of the Al salt. When the content of solvent is in this range, the $Al_2O_3$ coating layer is uniformly formed on the core active material.

An example of the coating method may be dip-coating but is not particularly limited thereto. The dip-coating is a process of dipping and removing the core active material from a mixture of Al salt and a solvent.

The drying process is performed at about 50 to about 130° C. A drying time may vary depending on the drying temperature, for example, in the range of about 1 to about hours. In such drying temperature and drying time ranges, the $Al_2O_3$ coating layer is further uniformly formed on the core active material.

Examples of the core active material may be the Mg-doped $LiCoO_2$. The content of Mg is about 0.01 to about 3 parts by weight based on 100 parts by weight of the core active material.

A heat treatment is performed on a core active material coated with an $Al_2O_3$ coating layer according to the processes described above (step 140 in FIG. 13).

The temperature of the heat treatment is in the range about 300 to about 1000° C.

The heat treatment is performed in air or in an oxygen atmosphere.

When the heat treatment temperature and atmosphere is in the stated range, magnesium aluminium oxide ($MgAlO_2$) is coated on the surface of the core active material by allowing Mg doped in the core active material to be transferred to the surface. Therefore, thermal and lithium-ion conduction properties of the finally obtained electrode active material are excellent.

After the heat treatment, a coating layer formed on the surface of a core active material may include $Al_2O_3$ as well as $MgAlO_2$.

The content of $MgAlO_2$ of the coating layer is in the range of about 0.001 to about parts by weight, for example, about 0.001 to about 0.1 parts by weight, based on 100 parts by weight of the core active material. When the content of $MgAlO_2$ is in this range, a life span and thermal stability of the battery may be excellent.

For x-ray photoelectron spectroscopy (XPS) analysis, excitation (using an ESCA spectrometer) was performed by using non-monochromatic Al Kα X-rays and a chamber pressure was about $5 \times 10^{-10}$ mbar during the XPS analysis.

After dispersing active material powder on indium foil, the samples are analyzed by being pasted on an XPS holder with double sided carbon tape.

Hereinafter, a method of preparing a lithium secondary battery using the electrode active material for a lithium secondary battery will be described, and more particularly, a method of preparing a lithium secondary battery having a positive electrode, a negative electrode, and an electrolyte using the electrode active material as a positive electrode active material as an embodiment according to the principles of the present invention, will be described.

The positive electrode and negative electrode are prepared by respectively coating and drying compositions for forming a positive electrode active material layer and compositions for forming a negative electrode active material layer on each current collector.

First, the composition for forming a positive electrode active material layer is prepared by using an electrode active material as an embodiment according to the principles of the present invention, as a positive electrode active material.

The composition for forming a positive electrode active material layer is prepared by mixing a positive electrode active material, a conductive agent, a binder, and a solvent.

The binder is a component that helps to combine the positive electrode active material and the conductive agent, or the like and bond with the current collector. The binder is added in the range of 1 part by weight to 50 parts by weight and for example, in the range of 2 parts by weight to 10 parts by weight based on 100 parts by weight of the positive electrode active material. When a content of the binder is in this range, a binding force of the positive electrode active material layer with respect to the current collector is strong.

Examples of the binder may be polyvinylidene fluoride, polyvinyl alcohol, carboxymethyl cellulose (CMC), starch, hydroxypropyl cellulose, regenerated cellulose, polyvinylpyrrolidone, polyethylene, polypropylene, ethylene-propylene-diene terpolymer (EPDM), sulfonated EPDM, styrene butyrene rubber, fluorine rubber, various copolymers, and the like.

The conductive agent is not particularly limited as long as it does not generate a chemical change in the battery, as well as having conductivity. Examples of the conductive agent may be graphite such as natural graphite or artificial graphite; carbon black such as acetylene black, Ketjen black, channel black, furnace black, lamp black; conductive fibers such as carbon fibers or metal fibers, metal powder such as aluminum powder, or nickel powder; conductive whiskers such as zinc oxide or potassium titanate; conductive metal oxide such as titanium oxide; a conductive material such as a polyphenylene derivative; and the like. A content of the conductive agent used is in the range of 1 part by weight to 30 parts by weight and for example, in the range of 2 parts by weight to 10 parts by weight based on 100 parts by weight of the positive electrode active material. When the content of the conductive agent is in this range, capacity characteristics may be maintained as well as the finally obtained electrode having excellent conductivity.

The solvent used may be N-methyl-2-pyrrolidone, and the like, and the content thereof is in the range of 80 parts by weight to 400 parts by weight based on 100 parts by weight of the positive electrode active material. When the content of the solvent is in this range, a process for forming the active material layer is facilitated.

The positive electrode current collector has a thickness range of about 3 μm to about 500 μm, but is not limited thereto as long as it does not generate a chemical change in the battery as well as having high conductivity. Examples of the positive electrode current collector may be stainless steel, aluminum, nickel, titanium, sintered carbon, or an aluminum or stainless steel surface treated with carbon, nickel, titanium, silver, and the like. Fine irregularities may also be formed on the surface of the current collector to increase adhesion of the positive electrode active material, and the current collector may have various forms such as a film, sheet, foil, net, porous body, foam, or nonwoven fabric.

Alternatively, a composition for forming a negative electrode active material layer is prepared by mixing a negative electrode active material, a binder, a conductive agent, and a solvent.

Examples of the negative electrode active material may be a carbon-based material capable of intercalating and deintercalating lithium ions, such as graphite, carbon, or lithium metal and alloys, a silicon oxide-based material, and the like.

The binder is a component that helps to combine the negative electrode active material and the conductive agent, or the like and bond with the current collector. The binder is generally added in the range of 1 part by weight to 50 parts by weight and for example, in the range of 2 parts by weight to 10 parts by weight based on 100 parts by weight of the negative electrode active material. This binder may be the same material as used in the positive electrode.

A content of the conductive agent used is in the range of 1 part by weight to 30 parts by weight and for example, in the range of 2 parts by weight to 10 parts by weight based on 100 parts by weight of the negative electrode active material. When the content of the conductive agent is in this range, conductivity of the finally obtained electrode is excellent.

A content of the solvent used is in the range of 80 parts by weight to 400 parts by weight based on 100 parts by weight of the negative electrode active material. When the content of the solvent is in this range, a process for forming the negative electrode active material layer is facilitated.

The same type of materials used in preparing the positive electrode may be employed for the conductive agent and solvent.

The negative electrode current collector generally has a thickness range of about 3 μm to about 500 μm, but is not limited thereto as long as it does not generate a chemical change in the battery as well as having conductivity. Examples of the negative electrode current collector may be copper, stainless steel, aluminum, nickel, titanium, sintered carbon, copper or a stainless steel surface treated with carbon, nickel, titanium, or silver, an aluminum-cadmium alloy, and the like. Also, adhesion of the negative electrode active material may also be increased by forming fine irregularities on the surface of the negative electrode current collector like the positive electrode current collector, and the negative electrode current collector may be used in various forms such as a film, sheet, foil, net, porous body, foam, or nonwoven fabric.

A separator is disposed between the positive electrode and the negative electrode prepared according to the above described processes.

A battery assembly is formed by disposing the separator between the foregoing positive electrode and negative electrode. The battery assembly is wound and folded to be contained in a cylindrical or rectangular battery case, and then a lithium-ion battery is completed by injecting an electrolyte solution. Also, the battery structure is stacked in a bi-cell structure, and then impregnated in an organic electrolyte solution according to an embodiment of the present invention. A lithium-ion polymer battery is completed when a product thus obtained is contained in a pouch and sealed.

FIG. 1 schematically illustrates a typical structure of a lithium secondary battery constructed as an embodiment according to the principles of the present invention.

As shown in FIG. 1, the lithium battery 10 includes a positive electrode 13 including a positive electrode active material according to an embodiment of the present invention, a negative electrode 12, a separator 14 disposed between the positive electrode 13 and the negative electrode 12, an electrolyte (not shown) impregnated between the positive electrode 13, the negative electrode 12, and the separator 14, a battery case 15, and a sealing member 16 sealing the battery case 15 as main elements. The positive electrode 13, the separator 14, and the negative electrode 12 are sequentially stacked, and then wound in a spiral shape. The lithium battery 10 may be formed by containing the spiral-shaped wound stack in the battery case 15.

The separator 14 has a pore diameter range of about 0.01 μm to about 10 μm, and has a thickness range of about 5 μm to about 300 μm. As a particular example, the separator 14 has a sheet or unwoven fabric form and is formed of an olefin-based polymer such as polyethylene or polypropylene, glass fibers, and the like. When a polymer electrolyte is used as an electrolyte, the polymer electrolyte may be used with the separator 14.

An electrolyte solution is prepared with a non-aqueous organic solvent and a lithium salt.

The non-aqueous organic solvent always includes chain carbonate and cyclic carbonate.

Examples of the chain carbonate may be dimethyl carbonate (DMC), ethylmethyl carbonate (EMC), diethyl carbonate (DEC), methylpropyl carbonate (MPC), dipropyl carbonate (DPC), ethylpropyl carbonate (EPC), and the like.

Examples of the cyclic carbonate may be ethylene carbonate (EC), propylene carbonate (PC), and the like.

A total content of the chain carbonate is in the range of 50 parts by volume to 90 parts by volume based on 100 parts by volume of the non-aqueous organic solvent.

The non-aqueous organic solvent may further include one or more first materials selected from the group consisting of an ester-based, ether-based, ketone-based, alcohol-based, or aprotic solvent.

Examples of the ester-based solvent may be methyl acetate, ethyl acetate, n-propyl acetate, dimethyl acetate, methyl propionate, ethyl propionate, γ-butyrolactone, decanolide, valerolactone, mevalonolactone, caprolactone, and the like. However, the ester-based solvent is not limited thereto.

Examples of the ether-based solvent may be dibutyl ether, tetraglyme, diglyme, dimethoxyethane, 2-methyltetrahydrofuran, tetrahydrofuran, and the like. However, the ether-based solvent is not limited thereto.

Examples of the ketone-based solvent may be cyclohexanone, and the like. However, the ketone-based solvent is not limited thereto.

Examples of the alcohol-based solvent may be ethyl alcohol, isopropyl alcohol, and the like. However, the alcohol-based solvent is not limited thereto.

Examples of the aprotic solvent may be nitriles such as R—CN (where R is a straight-chain, branched, or cyclic hydrocarbon group with a carbon atomic number range of about 2 to about 20 and may include a double bond aromatic ring or an ether bond), amides such as dimethylformamide, dioxolanes such as 1,3-dioxolane, sulfolanes, and the like. However, the aprotic solvent is not limited thereto.

For example, according to an embodiment of the present invention, the non-aqueous organic solvent includes EC, EMC, or DMC. For example, a mixing volume ratio of EC, EMC, and DMC is 3:4:4. However, the mixing volume ratio is not limited thereto.

A lithium salt in the electrolyte solution is dissolved in the non-aqueous organic solvent to act as a source of lithium ions in a lithium battery. Thus, the lithium salt enables a basic lithium battery operation and functions to promote transfer of lithium ions between the positive electrode and the negative electrode.

For example, the lithium salt may include one or more supporting electrolytic salts selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, or lithium bisoxalate borate ($LiB(C_2O_4)_2$).

A concentration of the lithium salt is in the range of about 1.0 M to about 2.0 M, and for example, about 0.6 M to about 2.0 M. The concentration of the lithium salt may be in the range of about 0.7 M to about 1.5 M. When the concentration of the lithium salt satisfies the foregoing ranges, appropriate conductivity and viscosity of the electrolyte solution may be achieved and lithium ions may be effectively transferred.

Hereinafter, the present invention will be described in more detail with reference to Examples below. However, the present invention is not limited thereto.

Preparation Example 1: Preparation of Electrode Active Material

About 5 g of aluminum isopropoxide was dissolved in 95 g of ethanol to prepare an aluminum isopropoxide solution.

A Mg-doped $LiCoO_2$ including a coating layer of aluminum oxide ($Al_2O_3$) formed on its surface was prepared by dipping, removing the Mg-doped $LiCoO_2$ from the aluminum isopropoxide solution, and drying the Mg-doped $LiCoO_2$ at the temperature of about 80° C. Here, the content of Mg was about 10 ppm.

An $Al_2O_3$ coated Mg-doped $LiCoO_2$ (Sample 1) was obtained by following the above process.

The Sample 1 was heat treated in air at about 100° C. for about 8 hours in an electric furnace to obtain an electrode active material (Sample 2) including a Mg-doped $LiCoO_2$ and a coating layer of magnesium aluminium oxide ($MgAlO_2$) formed on the surface of the Mg-doped $LiCoO_2$.

An average particle diameter of the electrode active material (Sample 2) is about 20 μm, and, a content of the magnesium aluminum oxide ($MgAlO_2$) is about 0.1 parts by weight based on 100 parts by weight of a core active material.

The electrode active material has about 85 weight % of $MgAlO_2$ existing on the surface area of the coating layer with a penetration depth of about 1-2 μm measured by EDX.

Figure 2:
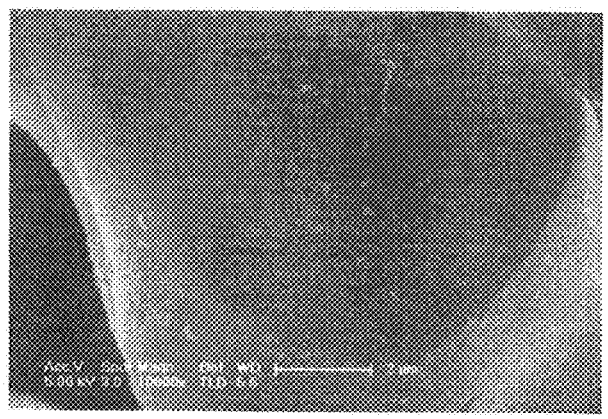
FIG. 2 is an scanning electron microscope (SEM) image of an electrode active material prepared as Sample 1 according to Preparation Example 1.
Figure 3:
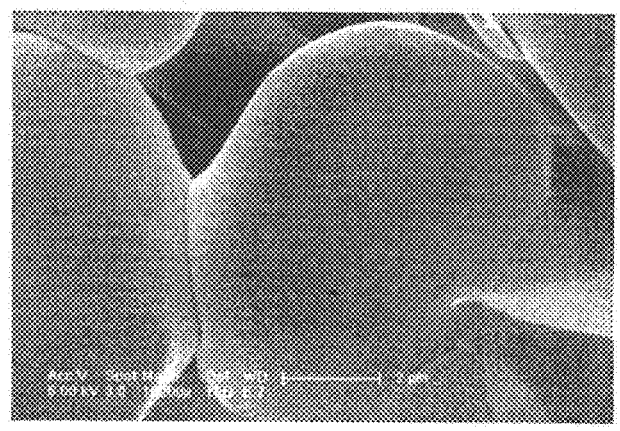
FIG. 3 is an scanning electron microscope (SEM) image of an electrode active material prepared as Sample 2 according to Preparation Example 1, as an embodiment according to the principles of the present invention.

A scanning electron microscope (SEM) image of Sample 1 is as shown in FIG. 2, and a SEM image of Sample 2 is as shown in FIG. 3.

Referring thereto, it may be understood that Sample 2 of FIG. 3 has better surface uniformity than Sample 1.

Figure 4:
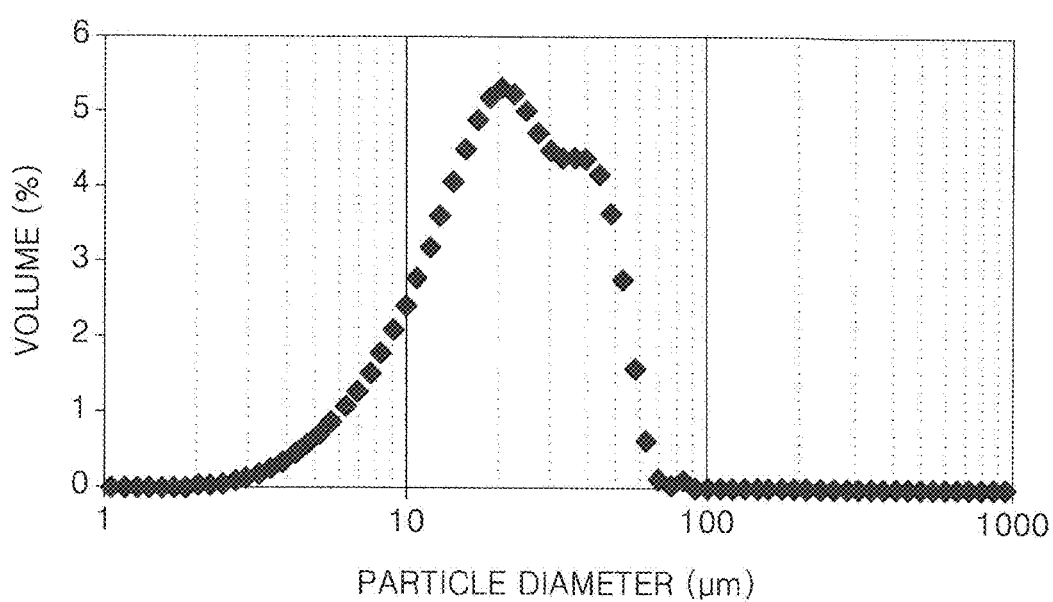
FIG. 4 is a graph showing particle size analysis of the electrode active material obtained as Sample 2 according to Preparation Example 1, as an embodiment according to the principles of the present invention.

A particle size analysis of the electrode active material (Sample 2) obtained according to Preparation Example 1 was performed, and the result is shown in FIG. 4. Here, the particle size analysis was performed using an instrument, LS13320 from Beckman Coulter.

Referring to FIG. 4, it is understood that D50 of an electrode active material is about 20 μm. Here, D50 is a particle diameter at a point corresponding to 50% of the cumulative particle size distribution curve.

EDX analyses of Sample 1 and Sample 2 obtained according to Preparation Example 1 were performed.

Figure 5:
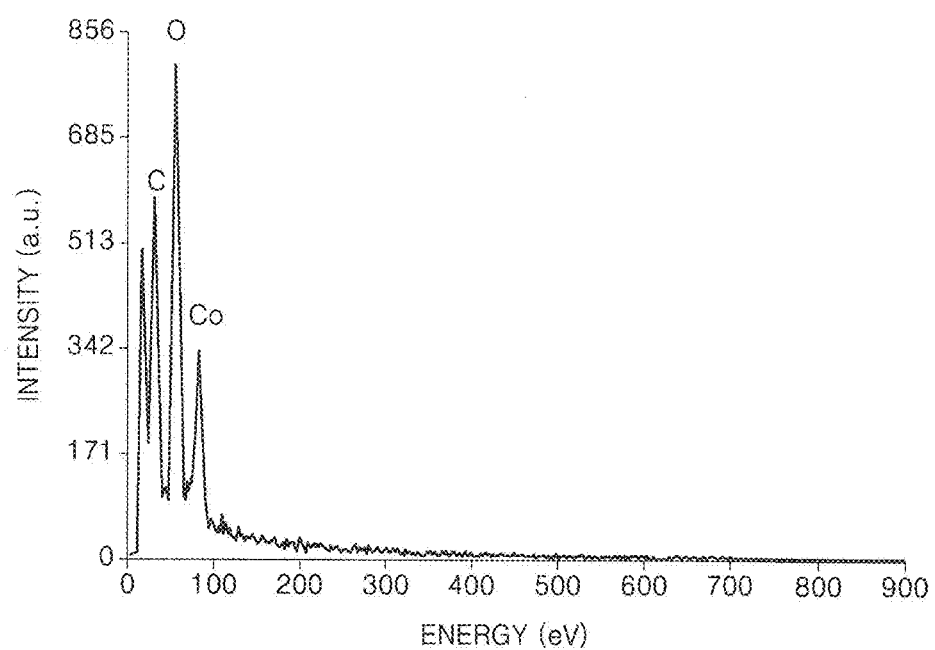
FIG. 5 is an energy dispersive x-ray (EDX) analysis graph of lithium cobalt oxide ($LiCoO_2$) doped with magnesium (Mg) (Sample 1), which has an aluminum oxide ($Al_2O_3$) coating layer, obtained according to Preparation Example 1.
Figure 6:
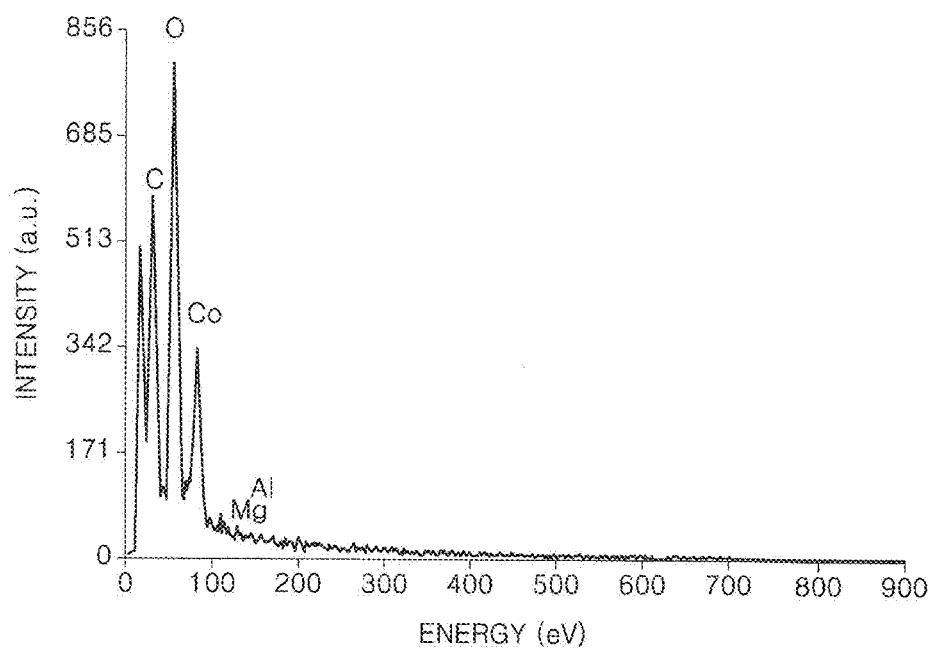
FIG. 6 is an EDX analysis graph of an electrode active material (Sample 2) obtained according to Preparation Example 1, as an embodiment according to the principles of the present invention.

The result of EDX analysis of Sample 1 obtained according to Preparation Example 1 is as shown in FIG. 5 and Table 1, and the result of EDX analysis of Sample 2 obtained according to Preparation Example 1 is as shown in FIG. 6 and Table 2. Here, the penetration depth measured by EDX analysis is about 1-2 μm.

TABLE 1

| Element | Weight % |
|---------|----------|
| C | 31.67 |
| O | 27.02 |
| Co | 41.31 |

TABLE 2

| Element | Weight % |
|---------|----------|
| C | 30.12 |
| O | 26.21 |
| Co | 41.92 |
| Mg | 0.65 (2.47 parts by weight based on 100 parts by weight of oxygen (O)) |
| Al | 1.10 (4.19 parts by weight based on 100 parts by weight of oxygen (O)) |

As a result of EDX analysis of FIGS. 5 and 6 and Table 1 and 2, Mg and Al were not detected at about 1-2 μm penetration depth of Sample 1, but Mg and Al were detected at about 1-2 μm penetration depth of Sample 2.

Figure 7:
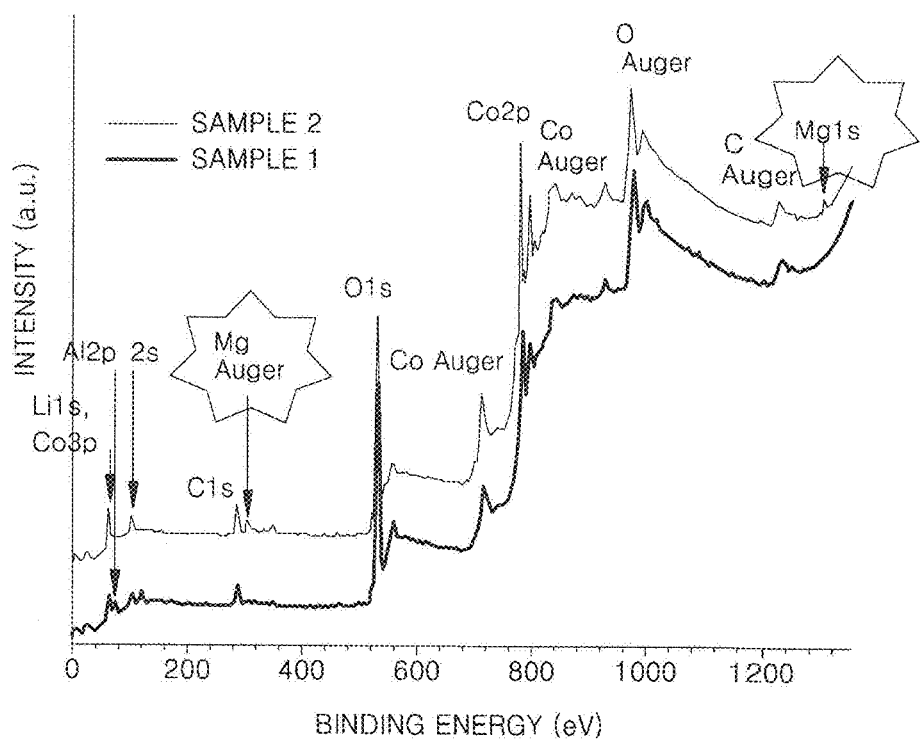
FIG. 7 shows analysis results of Sample 1 and Sample 2 obtained according to Preparation Example 1 using x-ray photoelectron spectroscopy (XPS)
Figure 8:
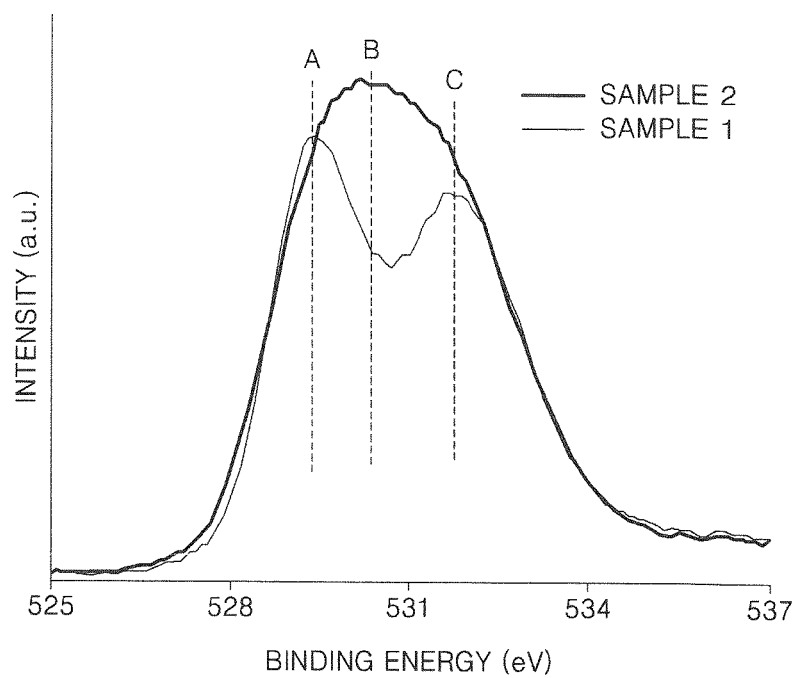
FIG. 8 shows XPS analysis spectra of Sample 1 and Sample 2 obtained according to Preparation Example 1 in detail.

Analyses of Sample 1 and Sample 2 obtained according to Preparation Example 1 using x-ray photoelectron spectroscopy were performed, and the results are respectively shown in FIG. 7 and FIG. 8.

Referring to FIG. 7, Sample 2 has new peaks appearing at a position corresponding to a Mg auger line and at a position corresponding to a 1s peak of Mg, so it may be understood that Mg inside the electrode active materials of Sample 2 is diffused out.

FIG. 8 shows 1s peak of oxygen in Sample 1 and Sample 2 obtained according to Preparation Example 1 in detail.

Peak A shows a peak of oxygen bound in the form of $LiCoO_2$, and peak B shows a peak of oxygen bound in the aluminium oxide ($Al_2O_3$). Peak C shows a peak of oxygen binding in the other oxygen bonds in those materials related to peak A and peak B. The peak B is shown at about 530.7 eV.

As shown in FIG. 8, an intensity of peak B of $Al_2O_3$ in Sample 1 is reduced in comparison to the than an intensity of peak B of $Al_2O_3$ in Sample 2, and an intensity of peak C in Sample 1 is much smaller than an intensity of peak C in Sample 2. Thus, it is apparent that $MgAlO_2$ as a new phase of is formed after the heat treatment.

In FIG. 8, a peak intensity ratio of peak A and peak C of Sample 2 was about 1:0.88, peak A and peak B was about 1:0.74, and peak B and peak C was about 1:1.19.

On the contrary, an intensity of Sample 1 was stronger than peak A.

Example 1: Preparation of Positive Electrode and Battery Using the Same

A 2032 coin-cell was prepared according to the following process using an electrode active material (Sample 2) prepared according to Preparation Example 1 as a positive electrode active material.

About 0.15 g of polyvinylidene fluoride and about 0.15 g of Denka black was added to about 4.7 g of the electrode active material prepared according to Preparation Example 1 as a positive electrode active material to obtain a mixture and then the mixture was dispersed in about 5.35 g of N-methylpyrrolidone to prepare a composition for forming a positive electrode active material layer. A mixing weight ratio of the positive electrode active material, polyvinylidene fluoride, and Denka black in the composition for forming a positive electrode active material layer was 94:3:3.

The composition for forming a positive electrode active material layer was coated on an aluminum foil to a thickness of about 135 μm, to prepare a thin electrode plate and then the resultant electrode plate was dried at about 110° C. for 20 minutes or more. Thereafter, the dried electrode plate was pressed to prepare a positive electrode plate having a thickness of about 40 μm.

Thereafter, a 2032 type coin-cell was prepared using the positive electrode and a lithium metal as a counter electrode of the positive electrode.

A separator (thickness: about 16 μm) composed of a porous polyethylene (PE) film was disposed between the positive electrode plate and the lithium metal counter, and an electrolyte solution was injected to prepare the 2032 type coin-cell.

At this time, the electrolyte solution used was a solution including 1.15 M $LiPF_6$ dissolved in a solvent mixed with EC, EMC, and DMC in a volume ratio of 3:3:4.

Comparative Example 1: Preparation of Positive Electrode and Battery Using the Same A coin-cell was prepared using a process similar to that of Example 1 except that the electrode active material (Sample 1) prepared according to Preparation Example 1 was used instead of using the electrode active material (Sample 2) prepared according to Preparation Example 1.

Figure 9:
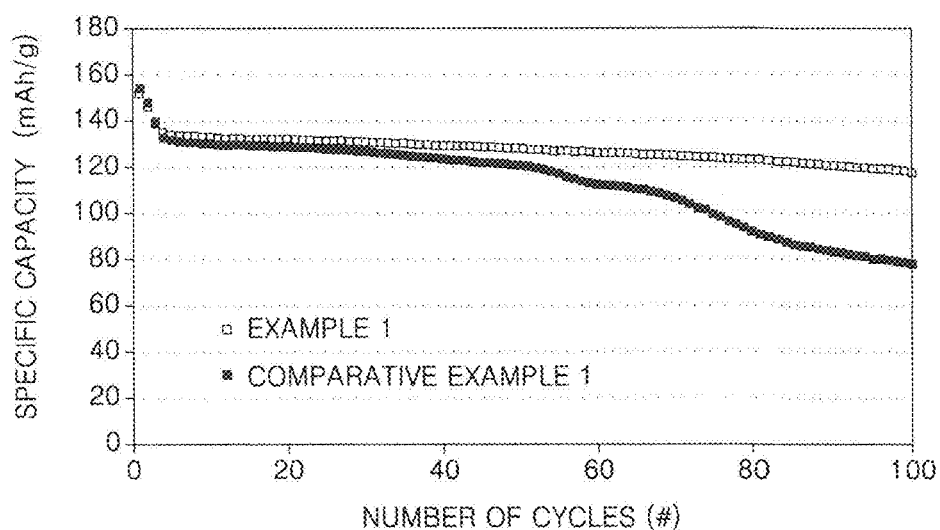
FIG. 9 shows specific capacity change according to the number of cycles of batteries prepared according to Example 1 and Comparative Example 1.
Figure 10:
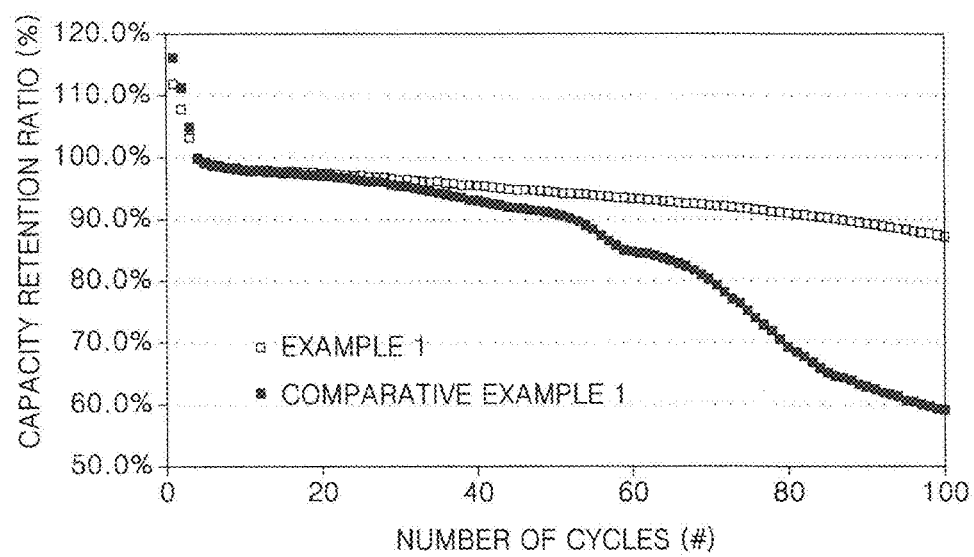
FIG. 10 shows capacity retention ratios of battery prepared according to Example and Comparative Example 1.

Charge-discharge characteristics at an initial 0.1 C and a charging and discharging process repeated 100 times were investigated in the batteries prepared according to Example 1 and Comparative Example 1, and the results thereof are shown in FIGS. 9 and 10.

The coin cell prepared according to Example 1 was subjected to about 100 cycles of charging at a constant current (0.1C, 0.2C, 2C, 0.5C, 1C-rate) to a cut-off of about 4.3 V and discharging at a constant current (0.1C, 0.2C, 0.5C, 1C-rate) to a cut-off of about 3.0 V. That is, life characteristics of each coin cell were evaluated by measuring a capacity retention ratio in terms of changes in a discharging capacity according to the number of charge-discharge cycles.

FIG. 9 shows a specific capacity change when a charge-discharge process is performed 100 times at a speed of 1.0C, and FIG. 10 shows a capacity retention ratio (%).

As FIG. 9 shows, after charge-discharge was performed 100 times, a discharging capacity of the coin cell in Example 1 was higher than that of the coin cell in Comparative Example 1. Also, as FIG. 10 shows, in the case of a capacity retention ratio (%), the capacity intention ratio of the coin cell in Example 1 was increased after charge-discharge was performed 100 times compared to the case of Comparative Example 1.

Figure 11:
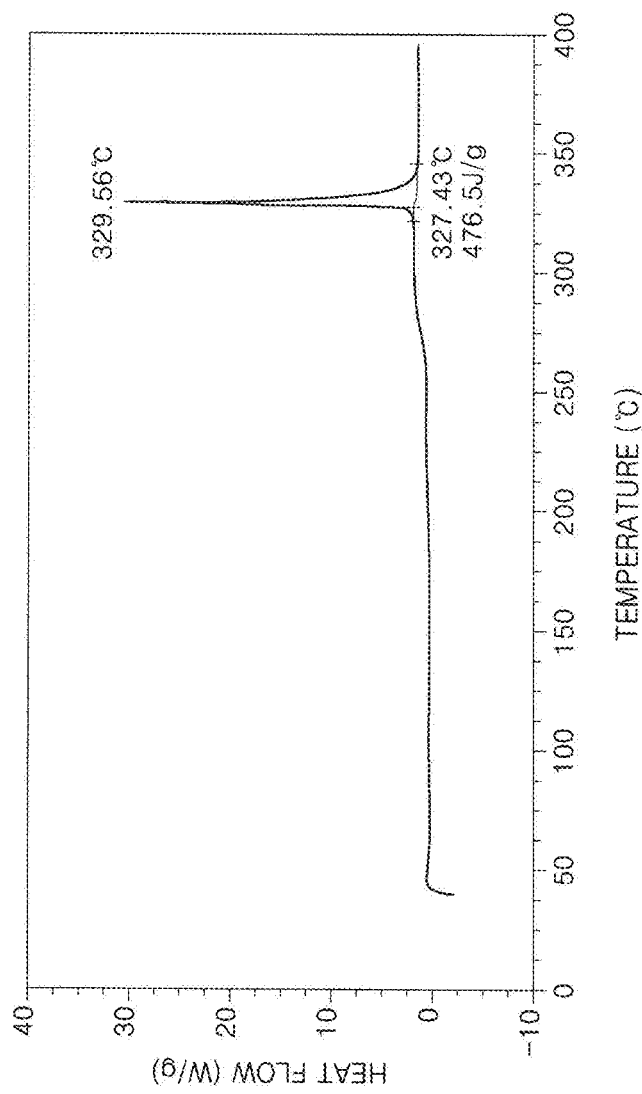
FIGS. 11 and 12 show results of differential scanning calorimeter (DSC) analysis performed on a positive electrode plate prepared according to Example 1 and Comparative Example 1, respectively.
Figure 12:
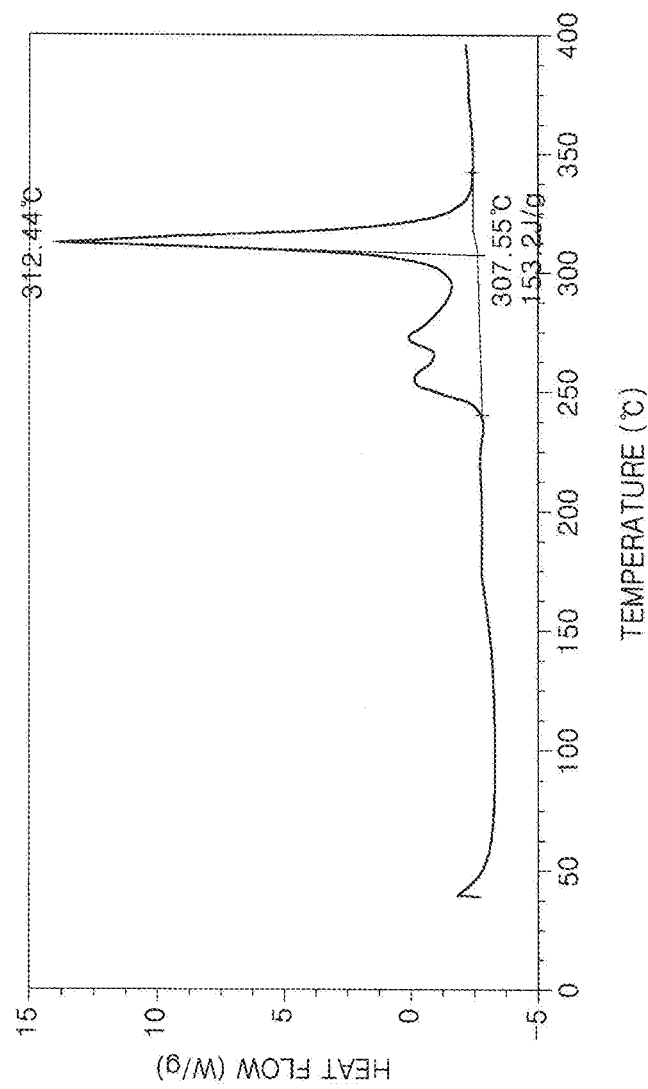

Calorific values of the positive electrode plate prepared according to Example 1 and Comparative Example 1 were investigated by using a differential scanning calorimeter (DSC: Q20 from TA), and the results thereof are shown in FIGS. 11 and 12. The measurements of calorific values of the positive electrode plate were made while heating to about 400° C. at a rate of 5° C. per minute.

Referring to FIGS. 11 and 12, thermal stability of the positive electrode plate in Example 1 was increased compared to the case of Comparative Example 1.

According to an embodiment of the present invention, a lithium secondary battery may have improved life span and thermal stability by using an electrode active material with a magnesium aluminum oxide coating layer.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. An electrode active material for a lithium secondary battery, the electrode active material comprising:
   a core active material; and
   a uniform coating layer comprised of magnesium aluminum oxide ($MgAlO_2$) and formed on a surface of the core active material, wherein a content of magnesium aluminum oxide ($MgAlO_2$) of the coating layer is in a range of about 0.001 to about 10 parts by weight based on 100 parts by weight of the core active material,
   1s binding energy peaks of oxygen (O) in the electrode active material measured by x-ray photoelectron spectroscopy (XPS) are shown at positions corresponding to
   529.4±0.5 eV,
   about 530.7 eV, and
   531.9±0.5 eV, and,
   a peak intensity at the position corresponding to 529.4±0.5 eV is stronger than a peak intensity at the position corresponding to about 530.7 eV, wherein a content of magnesium (Mg) at a penetration depth of 2 μm or less of the coating layer measured by energy dispersive x-ray analysis (EDX) is about 0.01 to about 3.0 weight % based on the total weight of the coating layer with the penetration depth of 2 μm or less, wherein a content of aluminum (Al) at a penetration depth of 2 μm or less of the coating layer measured by EDX is about 0.01 to about 3.0 weight % based on the total weight of the coating layer with the penetration depth of 2 μm or less, wherein the electrode active material is produced by a process comprising:
   forming a core of $LiCoO_2$;
   producing an Mg-doped $LiCoO_2$ core by doping the $LiCoO_2$ core with Mg until an Mg content is about 1 to about 15 parts per million (ppm) by weight of the $LiCoO_2$ core; and
   transferring the Mg from the Mg-doped $LiCoO_2$ core to the coating layer by performing a heat treatment in the range of about 300 to about 1000° C. in an air or oxygen atmosphere.

2. The electrode active material for the lithium secondary battery of claim 1, wherein an intensity ratio of the peak at the position corresponding to 529.4±0.5 eV to the peak at the position corresponding to about 530.7 eV is between about 1:0.6 through about 1:0.9.

3. The electrode active material for the lithium secondary battery of claim 1, wherein a peak intensity at the position corresponding to 531.9±0.5 eV is either the same or stronger than the peak intensity at the position corresponding to about 530.7 eV.

4. The electrode active material for the lithium secondary battery of claim 1, wherein an intensity ratio of the peak at the position corresponding to about 530.7 eV to the peak at the position corresponding to 531.9±0.5 eV is between about 1:1.0 through about 1:1.3.

5. The electrode active material for the lithium secondary battery of claim 1, wherein an intensity ratio of the peak at the position corresponding to about 529.4±0.5 eV to the peak at the position corresponding to about 531.9±0.5 eV is between about 1:0.7 through about 1:1.0.

6. The electrode active material for the lithium secondary battery of claim 1, wherein a content of Mg at a penetration depth of 2 μm or less of the coating layer measured by EDX is about 0.02 to about 20 parts by weight based on 100 parts by weight of oxygen in the coating layer with the penetration depth of 2 μm or less.

7. The electrode active material for the lithium secondary battery of claim 1, wherein a content of Al at a penetration depth of 2 μm or less of the coating layer measured by EDX is about 0.02 to about 20 parts by weight based on 100 parts by weight of oxygen in the coating layer with the penetration depth of 2 μm or less.

8. The electrode active material for the lithium secondary battery of claim 1, wherein the core active material is a lithium-transition metal composite oxide represented by the following Formula 1

$$Li_aMg_bMO_2 \qquad \text{[Formula 1]}$$

wherein M is at least one selected from the group consisting of cobalt (Co), manganese (Mn), iron (Fe), and nickel (Ni),
0<a≤1, and
0<b<0.5.

9. The electrode active material for the lithium secondary battery of claim 8, wherein M in Formula 1 is Co.

10. The electrode active material for the lithium secondary battery of claim 1, wherein binding energy peaks of Mg measured by XPS are shown at positions corresponding to 304.2±0.5 eV and 1302.2±0.5 eV.

11. The electrode active material for the lithium secondary battery of claim 1, wherein a thickness of the coating layer is about 1 nm to about 100 nm.

12. The electrode active material for the lithium secondary battery of claim 1, wherein an average particle diameter of the electrode active material is about 1 μm to about 80 μm.

13. An electrode for a lithium secondary battery, the electrode comprising the electrode active material according to claim 1.

14. A lithium secondary battery comprising the electrode of claim 1.

* * * * *